United States Patent [19]

Tsuchiyama et al.

[11] Patent Number: 5,958,021
[45] Date of Patent: Sep. 28, 1999

[54] INPUT-OUTPUT INTERFACE CIRCUIT WITH MULTIPLEXERS SELECTING AN EXTERNAL SIGNAL OR AN INTERNAL OUTPUT SIGNAL AS THE INPUT SIGNAL FROM AN I/O TERMINAL

[75] Inventors: Kiyoyuki Tsuchiyama, Yokohama; Hideyuki Yamada, Sagamihara; Kouichi Nakamura, Kiyose, all of Japan

[73] Assignee: Mazda Motor Corporation, Hiroshima, Japan

[21] Appl. No.: 08/593,288

[22] Filed: Jan. 29, 1996

[30] Foreign Application Priority Data

Jan. 30, 1995 [JP] Japan .................................. 7-012271

[51] Int. Cl.$^6$ .......................... H03K 19/173; G06F 13/00
[52] U.S. Cl. .................................... 710/12; 712/1; 326/38
[58] Field of Search ...................................... 395/800, 872, 395/892, 280, 832, 821; 364/712; 326/101, 37, 38, 41

[56] References Cited

U.S. PATENT DOCUMENTS

| 4,969,121 | 11/1990 | Chan et al. | 395/293 |
| 4,987,319 | 1/1991 | Kawana | 326/37 |
| 5,317,210 | 5/1994 | Patel | 326/40 |

FOREIGN PATENT DOCUMENTS 4118704   4/1992   Japan .

OTHER PUBLICATIONS

Pathak et al. "A 20ns CMOS Programmable Logic Device for Asynchronous Applications", Custom Integrated Circuits Conf. 1988.

*Primary Examiner*—Dinh C. Dung
*Attorney, Agent, or Firm*—Sixbey, Friedman, Leedom & Ferguson, P.C.; Gerald J. Ferguson, Jr.

[57] ABSTRACT

An input-output interface circuit operative in three different modes which utilizes a first signal selector, operative selectively in an external signal output mode and an internal signal transmission mode, having one output terminal to which a signal is transmitted from a signal processor and first and second output terminals, a second signal selector, operative selectively in an external signal input mode and an internal signal transmission mode, having one output terminal through which a signal input to the signal processor is transmitted and first and second output terminals, the first output terminal of the first signal selector being connected to the external input-output terminal by an external output signal transmission channel; the second output terminal of the first signal selector being connected to the first input terminal of the second signal selector by an internal signal transmission channel; and the external input-output terminal being connected to the second input terminal of the second signal selector by an external input signal transmission channel.

8 Claims, 4 Drawing Sheets

INPUT-OUTPUT INTERFACE CIRCUIT WITH MULTIPLEXERS SELECTING AN EXTERNAL SIGNAL OR AN INTERNAL OUTPUT SIGNAL AS THE INPUT SIGNAL FROM AN I/O TERMINAL

BACKGROUND OF THE INVENTION

1. Field of the Invention

The present invention relates to an input-output interface circuit structure installed between an input-output processing device and an external input-output terminal, which transmits an external input signal from the external input-output terminal to the input-output processing device as an input signal and also transmits an output signal from the input-output processing device to the external input-output terminal as an external output signal.

2. Description of Related Art

Computer systems equipped with central processing units (which are hereafter referred to as CPUs as necessary) typically incorporate a plurality of external input-output terminals for the central processing unit. Such a computer system has a signal processing means or device to process signals input to and output from the central processing unit, and an input-output interface circuit between the signal processing device and the external input-output terminals. The signal processing device, which is governed in operation by the central processing unit, performs specific processing on signals input thereto to convert them into input data to the central processing unit, and performs specific processing on output data coming out of the central processing unit to convert them into output signals. The input-output interface circuit transmits external signals from the external input-output terminals to the signal processing device as input signals and also transmits signals output from the signal processing device to the external input-output terminals as external signals.

This type of input-output interface circuit utilized in a computer system is well known in the art and shown by way of example in FIG. 4. An signal processing circuit, shown as being accompanied by an external input-output terminal 11, is comprised by an input signal forming network consisting of serial connection of an input buffer circuit 12 and a latch circuit 13, through which an external signal (SIP) input from the external input-output terminal 11 is transmitted to the signal processing device, and an output signal forming network consisting of serial connection of a latch circuit 14 and an output buffer circuit 15, through which an output signal (SOP) from the signal processing device is transmitted to the external input-output terminal 11. The input buffer circuit 12 and output buffer circuit 15 are comprised, for example, of a tri-state type of buffer amplifiers which assume ON and OFF states according to externally supplied control signals (CSP): the input buffer circuit 12 going ON when the output buffer circuit 15 goes OFF; and the input buffer circuit 12 going OFF when the output buffer circuit 15 goes ON. While an externally supplied control signal (CSP) turns the input buffer circuit 12 OFF and the output buffer circuit 15 ON, an external signal (SIP) is supplied, as an input signal to be input to the signal processing device, to an output side of the latch circuit 13 through the input signal forming network, i.e. the serial connection of the input buffer circuit 12 and latch circuit 13, from the external input-output terminal 11. On the other hand, while a control signal (CSP) turns the input buffer circuit 12 ON and the output buffer circuit 15 OFF, an output signal (SOP) from the signal processing device runs through the output signal forming network, i.e. the serial connection of the latch circuit 14 and output buffer circuit 15, and is transmitted as an external output signal to the external input-output terminal 11 after amplification at the output buffer circuit 15.

FIG. 5 shows another example of a conventional input-output interface circuit accompanied by an external input-output terminal means or device 11, which incorporates multiplexers 16 and 17 installed on opposite sides of a latch circuit 18, respectively, in addition to an input buffer circuit 12 and an output buffer circuit 15 similar to those incorporated in the conventional input-output interface circuit previously described and shown in FIG. 4.

The multiplexer 16 is equipped with two input terminals and one output terminal. An output signal (SOP) is fed to one of the input terminals of the multiplexer 16 from the signal processing device, and an input signal (SIP) is fed to another input terminal of the multiplexer 16 from the external input-output terminal device 11 through the input buffer circuit 12. While the output buffer circuit 15 goes OFF with an external control signal (CSP), the multiplexer 16 responds to the external control signal (CSP) by accepting, at its output terminal, an external input signal (SIP) from the external input-output terminal device 11 through the input buffer circuit 12. On the other hand, while the output buffer circuit 15 goes ON with an external control signal (CSP), the multiplexer 16 also responds to the external control signal (CSP) by accepting an output signal (SOP) from the signal processing device. Similarly, the multiplexer 17 is equipped with two output terminals and one input terminal, and receives at the input terminal either one of the output signal (SOP) and the external input signal (SIP) through the multiplexer 16 via the latch circuit 18. While an external control signal (CSP) puts the output buffer circuit 15 into an OFF state, the multiplexer 17 responds to the external control signal (CSP) by transmitting the external input signal (SIP) to either one of the output terminal; and while an external control signal (CSP) puts the output buffer circuit 15 into an ON state, the multiplexer 17 responds to the external control signal (CSP) by transmitting an output signal (SOP) to another output terminal.

In addition, while an external control signal (CSP) puts the input buffer circuit 12 in the ON state and the output buffer circuit 15 in the OFF state, the input signal (SIP) from the external input-output terminal device 11 passes through the input buffer circuit 12 and enters the multiplexer 16 through one of the input terminals and then to the latch circuit 18 through the output terminal of the multiplexer 16. It is further transmitted to the signal processing device as an input signal from the multiplexer 17 through one of the output terminals. Further, while an external control signal (CSP) puts the input buffer circuit 12 in the OFF state and the output buffer circuit 15 in the ON state, an output signal (SOP) from the signal processing device is transmitted to one of the input terminals of the multiplexer 16 and then to the output buffer circuit 15 through the multiplexer 17 via the latch circuit 18. The output signal (SOP) is amplified at the output buffer circuit 15 and finally transmitted to the external input-output terminal 11 as an external signal.

As previously stated, in the case where computer system incorporates a signal processing device installed between a central processing unit and multiple external input-output terminals so as to process signals input to and output from the central processing unit, and an input-output interface circuit connecting the signal processing device the external input-output terminals, from the point of view of monitoring wave forms of signals input to and output from the signal processing device, there is a strong demand on the input-output interface circuit for an operating mode in which an signal output from the signal processing device is re-input to the signal processing device again as an internal signal as well as an operating mode in which an external signal is input to the signal processing device as an input signal from the external input-output terminal and an operating mode in which a signal output from the signal processing device is supplied to the external input-output terminal as an external signal.

The prior art input-output interface circuit shown in FIG. 4 or 5 has no signal transmission channel which allows a signal output from the signal processing device to return to the same again as an internal signal and consequently, is incapable of re-directing the output signal from the signal processing device toward the signal processing device without first transmitting it to the external input-output terminal. In other words, in order for the prior art input-output interface circuit to re-direct the output signal from the signal processing device toward the signal processing device as an internal signal, a special internal signal input port must be installed for internally transmitting the internal signal to the signal processing device.

SUMMARY OF THE INVENTION

It is an object of the present invention to provide an input-output interface circuit, installed between a signal processing device and an external input-output terminal device, which is operative selectively in three operating modes, i.e. an operating mode in which an external signal is input to the signal processing device as an input signal from the external input-output terminal, an operating mode in which a signal output from the signal processing device is transmitted to the external input-output terminal as an external signal, and an operating mode in which an signal output from the signal processing device is re-input to the signal processing device again as an internal signal.

It is another object of the present invention to provide an input-output interface circuit, installed between a signal processing device and an external input-output terminal device, which does not needs any special internal signal input port for internally transmitting an internal signal to the signal processing device.

These objects of the present invention are achieved by providing an input-output interface circuit which utilizes a first signal selector means or device equipped with one output terminal to which a signal is transmitted from a signal processing means or device and first and second output terminals, a second signal selector means or device equipped with an output terminal through which a signal input to the signal processing device is transmitted and first and second output terminals, the first output terminal of the first signal selector device being connected to the external input-output terminal by means of an external output signal transmission channel; the second output terminal of the first signal selector device being connected to the first input terminal of the second signal selector device by means of an internal signal transmission channel; and the external input-output terminal being connected to the second input terminal of the second signal selector device by means of an external input signal transmission channel. The first signal selector device is operative selectively in two operative mode, i.e. an external signal output mode in which a signal output from the signal processing device is transmitted to the external input-output terminal as an external output signal through the external output signal transmission channel; and an internal signal transmission mode in which a signal output from the signal processing device is re-input to the signal processing device as an internal signal through the internal signal transmission channel. The second signal selector device is operative selectively in two operative mode, i.e. an external signal input mode in which a signal input from the external input-output terminal is transmitted to the signal processing device as an input signal through the external input signal transmission channel; and an internal signal transmission mode in which an internal signal through the internal signal transmission channel is transmitted to the signal processing device as an input signal.

According to the input-output interface circuit, a signal output from the signal processing device is taken out to the external input-output terminal as an external output signal through the external output signal transmission channel when the first signal selector device is in the external signal output mode, and a signal input from the external input-output terminal is supplied to the signal processing device as an input signal through the external input signal transmission channel when the second signal selector device is in the external signal input mode. Further, a signal from the signal processing circuit is re-input to the same as an internal signal when the first and second signal selector devices are in the internal signal transmission modes.

The input-output interface circuit incorporates ingeniously the circuit section for handling an output signal from the signal processing device and the circuit section for handling an input signal from the external input-output terminal in such a manner to cooperate with the first and second signal selector devices and the internal signal transmission channel, so as to be operative selectively in three operating modes without being equipped with any special internal signal transmission channel.

BRIEF DESCRIPTION OF THE DRAWINGS

The above and other objects and features of the present invention will be clearly understood from the following description with respect to preferred embodiments thereof when considered in conjunction with the accompanying drawings, wherein the same reference numerals have been used to denote same and similar parts or elements throughout the drawings, and in which.

DETAILED DESCRIPTION OF THE PREFERRED EMBODIMENTS

Parts which are not of direct importance to the invention and parts which are purely of conventional construction and operation will not be described in detail. For example, details of multiplexers, latch circuits and buffer circuits which are necessary for computer systems will not been set out in detail since their construction and operation can easily be arrived by a person skilled in the computer art.

Figure 2:
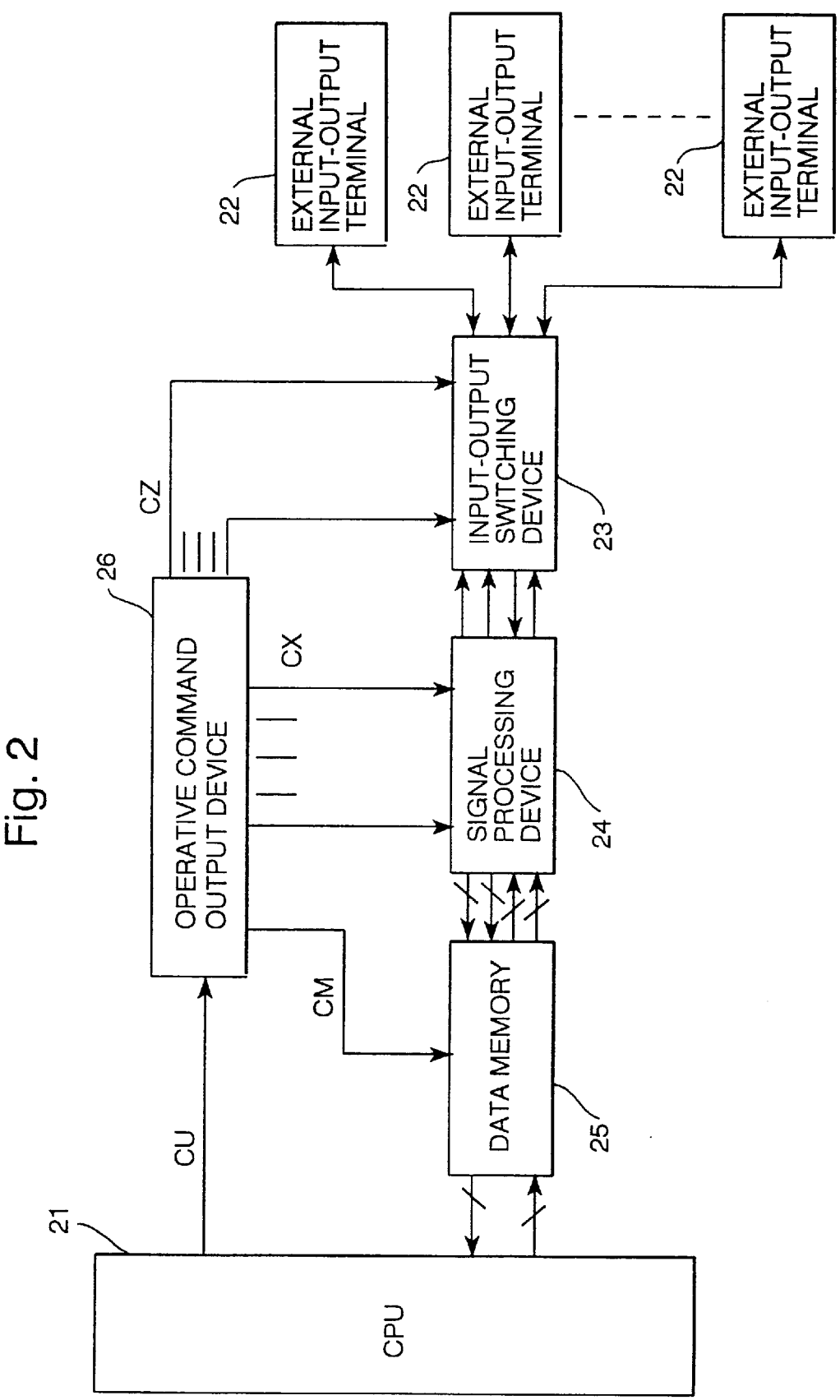
FIG. 2 is a block diagram showing the computer system equipped with a central processing unit in which the an input-output interface circuit is employed.

Referring to the drawings in detail, in particular, to FIG. 2 showing a computer system equipped with a central processing unit (CPU) 21 in which an input-output interface circuit in accordance with an embodiment of the present invention is incorporated, the computer system is equipped with a plurality of external input-output terminal means or devices 22 for the central processing unit 21. There are equipped in the computer system an input-output switching means or device 23, an signal processing device 24, and a data memory means or device 25 arranged between the central processing unit 21 and external input-output terminal devices 22. Together, an operative command output means or device 26, which governs operations of various device including the input-output switching device 23, signal processing device 24 and data memory device 25 by a programmed control sequence, applies operative command signals to them.

With a operative command signal CU from the central processing unit 21, the operative command output device 26 outputs operative command signals CM, CX and CZ to the data memory device 25, signal processing device 24, and input-output switching device 23, respectively. Under control with the operative command signal CZ from the operative command output device 26, the input-output switching device 23 accepts an external input signal from selected one of the input-output terminal devices 22 selected and transmits it as an input signal to the signal processing device 24, and transmits an output signal from the signal processing device 24 to selected one of the external input-output terminal devices 22 as an external output signal. The signal processing device 24, under control with the operative command signal CX from the operative command output device 26, applies specific signal processing to an input signal from the input-output switching device 23 in order to format that signal as input data suitably for the central processing unit 21 and sends the input data to the data memory device 25, and also applies specific signal processing to output data from the central processing unit 21 through the data memory device 25 in order to transform that output data as output signals and sends it to the input-output switching device 23. The operation of data memory device 25 is controlled by means of the operative command signal CM output by the operative command output device 26.

Figure 1:
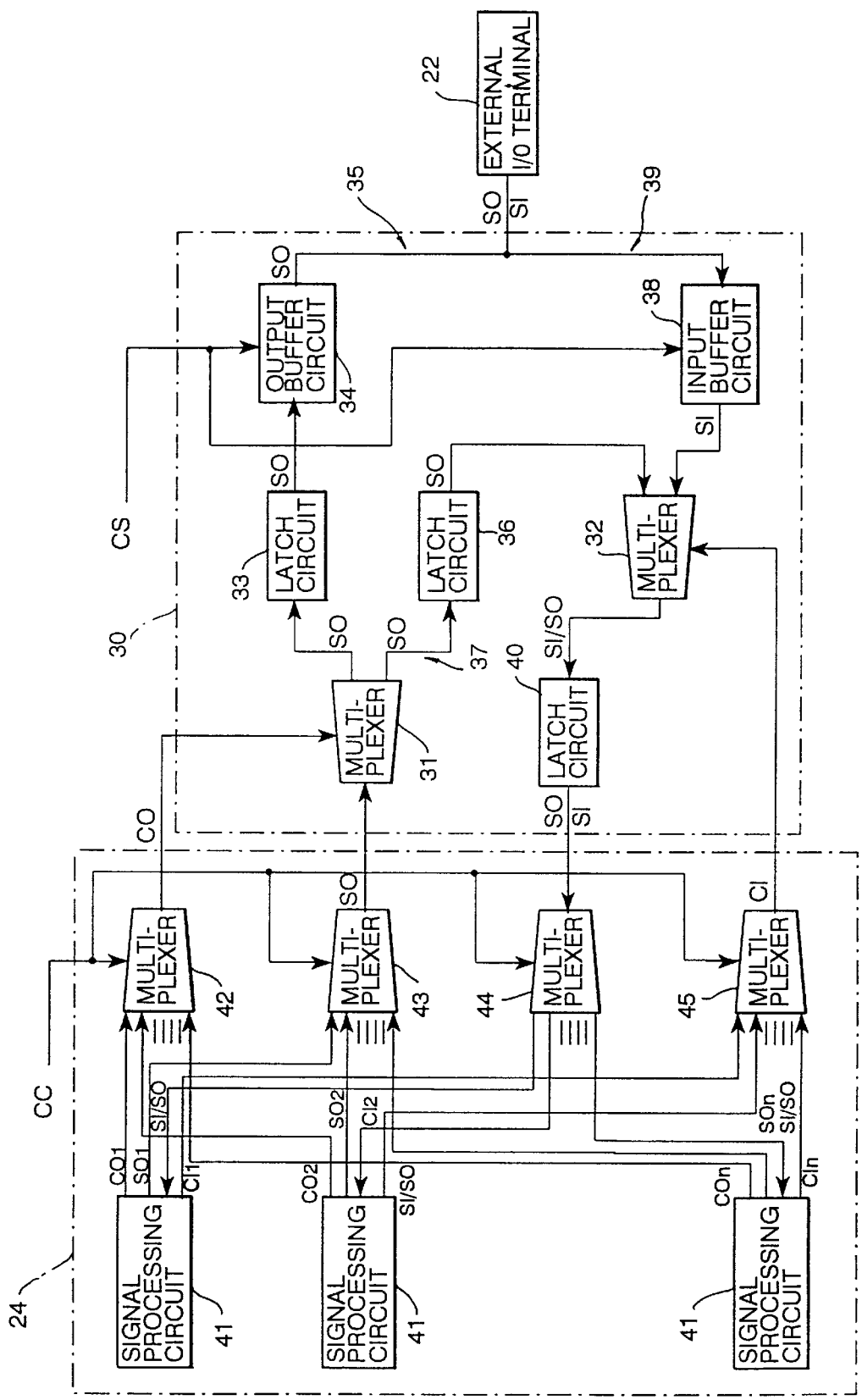
FIG. 1 is a block diagram showing an input-output interface circuit in accordance with a preferred embodiment of the present invention incorporated by way of example as an input-output switching device installed between a signal processing device and an external terminal device of a computer system.

The computer system described by way of example incorporates an input-output interface circuit of the present invention shown by way of example in FIG. 1 as the input-output switching device 23 for each of the external input-output terminal devices 22.

Referring to FIG. 1 showing the input-output interface circuit 30 employed as the input-output switching device 23 which is incorporated between the external input-output terminal device 22 and signal processing device 24. As shown in FIG. 1, the signal processing device 24 incorporates an even number n of signal processing circuits 41 which provide output selection signals CO1–COn, and output signals SO1–SOn and input selection signal CI1–Cin, respectively. The signal processing device 24 further incorporates four multiplexers 42 to 45. The multiplexer 42 receives those output control signal CO1 to COn and selects and transmits one of them as an eventual output control signal CO. The multiplexer 43 receives those output signal SO1 to SOn and selects and transmits one of them as an output signal SO. Similarly, the multiplexer 45 receives those input control signal CI1 to CIn and selects and transmits one of them as an eventual input control signal CI. The multiplexer 44 provides input signals SI and SO and sends them selectively to the signal processing circuits 41.

A selection command signal CC contained in the operative command signal CX provided by the operative command output device 26 is applied to each of the multiplexers 42, 43 and 45 so as to cause them to output an output selection control signal CO, an output signal SO and an input selection control signal CI in response to the selection command signal CC. The selection command signal CC is also applied to the multiplexer 44 so as to cause it to selectively supply the input signals SI and SO to all of the signal processing circuits 41.

The input-output interface circuit 30 as configured according to the invention incorporates multiplexers 31 and 32 as first and second signal selector device, the multiplexer 31 being equipped with an input terminal to which the output signal SO is supplied from the multiplexer 43 of the signal processing device 24 and further equipped with a first and second output terminals; and the multiplexer 32 being equipped with an output terminal through which an input signal is supplied to the multiplexer 44 of the signal processing device 24 and further equipped with first and second input terminals. In addition, the input-output interface circuit 30 also incorporates an external output signal transmission means or channel 35, an internal signal transmission means or channel 37, an external input signal transmission means or channel 39 and a latch device 40. The external output signal transmission channel 35 includes a latch circuit 33, an output buffer circuit 34, and connection between the first output terminal of the multiplexer 31 forming the first signal selector device and the external input-output terminal; the internal signal transmission channel 37 includes a latch circuit 36 and connection between the second output terminal of the multiplexer 31 forming the first signal selector device and the first input terminal of the multiplexer 32 forming the second signal selector device; and the external input signal transmission channel 39 includes an input buffer circuit 38 and connection between the external input-output terminal device 22 and the second input terminal of the multiplexer 32 forming the second signal selector device. The latch device 40 is connected to the output terminal of the multiplexer 32 forming the second signal selector device and receives an input signal from the multiplexer 32.

The multiplexer 31 is supplied with an output selection signal CO the from the multiplexer 42 of the signal processing device 24 and responds to the output selection signal CO by either feeding an output signal SO to the external output signal transmission channel 35 from the first output terminal thereof as an external output signal for the external input-output terminal device 22 or feeding the output signal SO to the internal signal transmission channel 37 from the second output terminal thereof as an internally transmissive signal. The multiplexer 32 is supplied with an input selection signal CI from the multiplexer 45 in the signal processing device 24 and responds to the input selection signal CI by either feeding an external input signal SI, which is supplied to the second input terminal of the multiplexer 32 through the external input signal transmission channel 39 from the external input-output terminal device 22, to the multiplexer 44 in the signal processing device 24 as an input signal, or feeding the output signal SO, which is supplied as an internally transmissive signal to the first terminal of the multiplexer 32 through the internal signal transmission channel 37, to the multiplexer 44 of the signal processing device 24 as an input signal.

The output buffer circuit 34 and input buffer circuit 38, which are established as, for instance, tri-state amplifier circuits, are supplied with an input-output switching command signal CS which is contained in the operative command signal CZ from the operating command output device 26. The output buffer 34 assumes, in response to the input-output switching control signal CS, an ON state in the case where the multiplexer 31 transmits the output signal SO to the external output signal transmission channel 35 through its first output terminal as an external output signal which in turn is output to the external input-output terminal device 22, or assumes an OFF state in the cases other than the above operation that the multiplexer 31 causes. The input buffer circuit 38 assumes, in response to the input-output switching control signal CS, an ON state in the case where the multiplexer 32 transmits the external input signal Si supplied to the second input terminal thereof through the external input signal transmission channel 39 to the multiplexer 44 of the signal processing device 24 as an input signal, or assumes an OFF state in the cases other than the above operation that the multiplexer 32 causes.

In the input-output interface circuit 30 thus structured and operating, while the output buffer circuit 34 assumes its ON state in response to the input-output switching signal CS, the multiplexer 31 receiving the output selection signal CO from the multiplexer 42 in the signal processing device 24 transmits the output signal SO supplied to its input terminal to the external output signal transmission channel 35 through its first output terminal as the external output signal which in turn is further transmitted to the external input-output terminal device 22. Resultingly, the output signal SO from the multiplexer 43 in the signal processing device 24 is amplified at the output buffer circuit 34 while passing through the external output signal transmission channel 35, and fed to the external input-output terminal device 22 as an output signal.

With the input buffer circuit 38 assuming its ON state in response to the input-output switching control signal CS, the multiplexer 32 responds to the input selection signal CI from the multiplexer 45 of the signal processing device 24 by transmitting the external input signal SI supplied to its second input terminal from the external input-output terminal device 22 through the external input signal transmission channel 39 to the multiplexer 44 in the signal processing device 24 as the input signal. Resultingly, the external input signal SI from the external input-output terminal device 22 is amplified at the input buffer circuit 38 while passing through the external input signal transmission channel 39 and fed to the multiplexer 44 in the signal processing device 24 as the input signal through the latch device 40.

While the multiplexer 31, in response to the output selection signal CO from the multiplexer 42 in the signal processing device 24, transmits the output signal SO through its second terminal to the internal signal transmission channel 37 as an internal signal, the multiplexer 32, in response to the input selection signal CI from the multiplexer 45 in the signal processing device 24, transmits the output signal SO as an internal signal through the internal signal transmission channel 37 to the multiplexer 44 in the signal processing device 24. Resultingly, the above operation places the input-output interface circuit 30 in a condition in which the output signal SO from the multiplexer 43 in the signal processing device 24 transmits an input signal not to the external input-output terminal device 22 as an external output signal but to the multiplexer 44 of the signal processing device 24 as an internal signal through the internal signal transmission channel 37 including the latch device 40.

Figure 3:
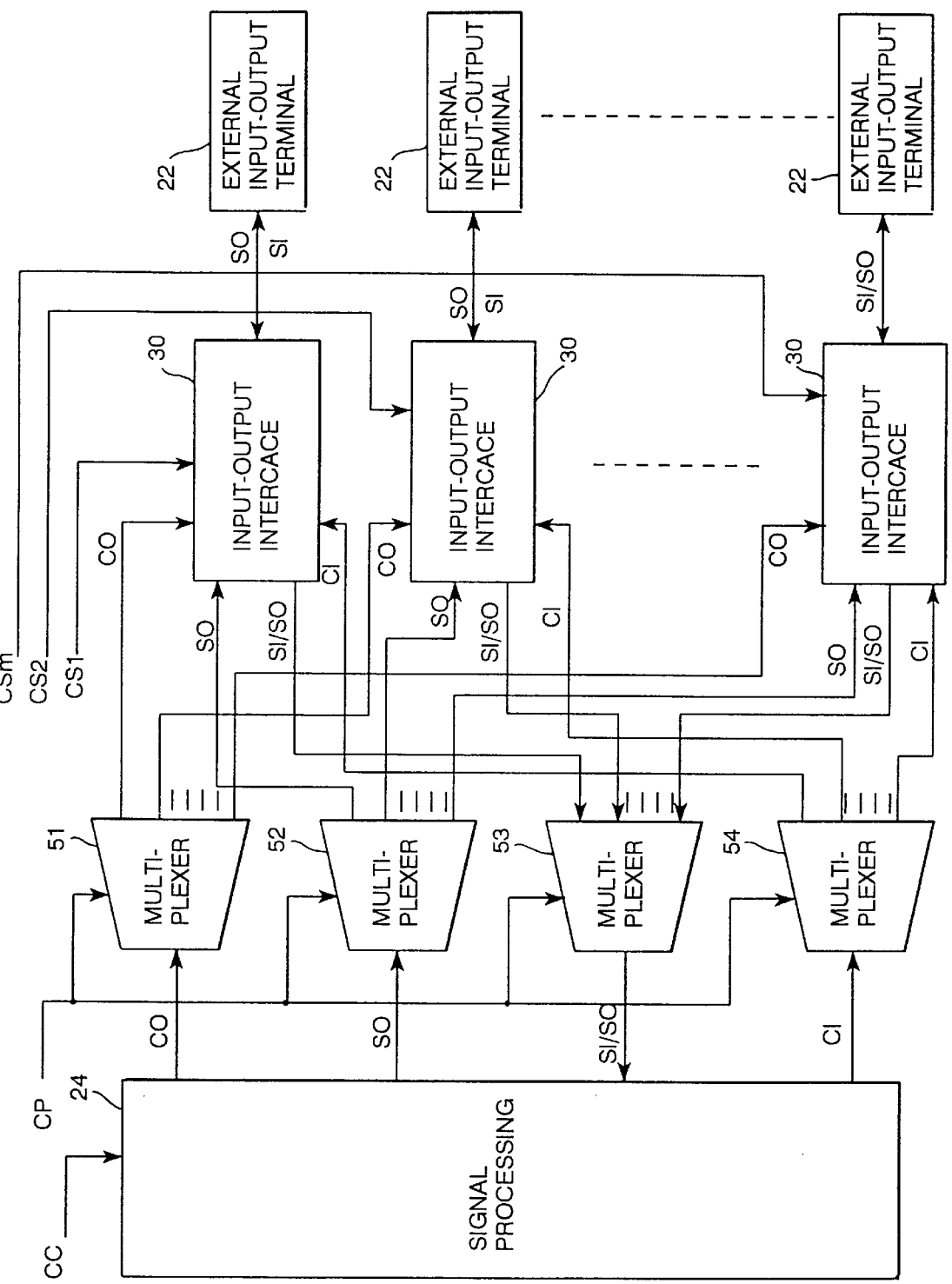
FIG. 3 is a block diagram showing a plurality of input-output interface circuits in accordance with a preferred embodiment of the present invention incorporated by way of example as input-output switching devices installed between a signal processing device and a plurality of external terminal devices of a computer system.
Figure 4:
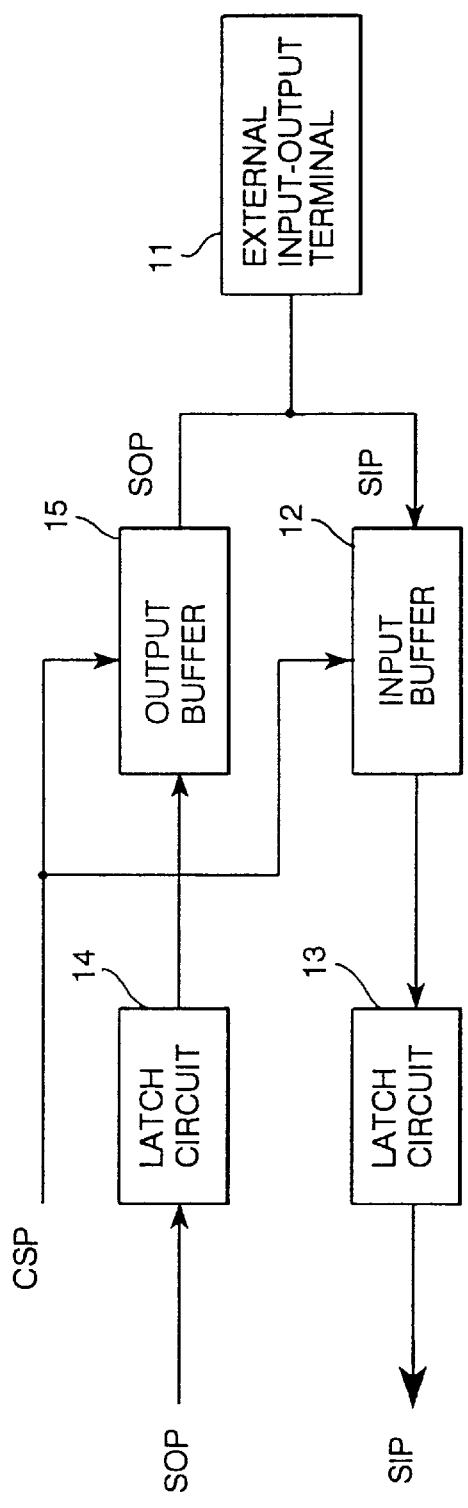
FIG. 4 is a block diagram showing an prior art input-output interface circuit accompanied by an external input-output terminal device.
Figure 5:
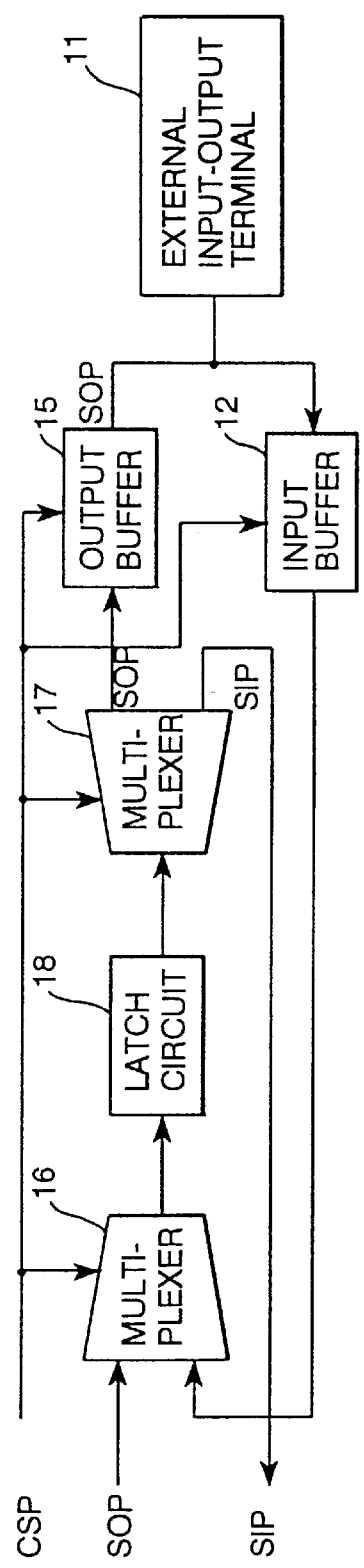
FIG. 5 is a block diagram showing another prior art input-output interface circuit accompanied by an external input-output terminal device.

FIG. 3 shows another example of a computer system as explained previously in FIG. 2, but in which the input-output switching device 23 consist of a plurality, or specifically the number of m in this embodiment, of input-output interface circuits 30, each of which is the same in structure and operation as the input-output interface circuits 30 shown in FIG. 1.

The computer system of FIG. 3 includes multiplexers 51–54 installed between an signal processing device 24 and external input-output terminal devices 22 of the same number m as the input-output interface circuits 30. The multiplexer 51 is fed with an output selection signal CO from the signal processing device 24 and transmits the output selection signal CO selectively to multiplexers 31 (see FIG. 1) forming the first signal selector device of the respective input-output interface circuits 30. the multiplexer 52 is fed with an output signal SO from the signal processing device 24 and transmits it selectively to input terminals of the respective multiplexers 31. The multiplexer 54 is fed with an input selection signal CI from the signal processing device 24 and transmits it to multiplexers 32 (see FIG. 1) forming second signal selector device of the respective input-output interface circuits 30. The multiplexer 53 receives external input signals SI or output signals SO as internal signals from the respective input-output interface circuit 30 and selectively transmits them to the signal processing device 24. An operative command signal output device 26 provides for the multiplexers 51–54 an input-output circuit selection signal CP included in an operative command signal CZ. The multiplexers 51, 52 and 54 respond to the input-output circuit selection signal CP by selectively transmitting the output selection signals CO, output signals SO and input selection signals CI. On the other hand, the multiplexer 53 selectively transmits input signals from the respective input-output interface circuits 30 to the signal processing device 24 in response to the input-output circuit selection signal CP.

The input-output interface circuits 30 are connected to the same number of external input-output terminal devices 22, respectively. The operative command signal output device 26 provides for the output buffer circuits 34 and input buffer circuits 38 (see FIG. 1) of the respective input-output interface circuits 30 input-output switching signals CS1–CSm included in an operative command signal CZ. Resultingly, in the same way as the output buffer circuit 34 and input buffer circuit 38 shown in FIG. 1 of the input-output interface circuit 30 selectively assume their ON and OFF states in response to the switching control signal CS, the output buffer circuits 34 and input buffer circuits 38 respond to the input-output switching signals CS1–CSm, respectively, by selectively assuming their ON and OFF states.

In these conditions, when the respective input-output interface circuits 30, in response to the input-output circuit selection signal CP, receive selectively the output selection signals CO, output signal SO and input selection signal CI from the multiplexers 51, 52 and 54, respectively and supply selectively external input signals SI and output signal SO to the signal processing device 24 through the multiplexer 53, they operate in the same manner as the input-output interface circuit 30 previously described in FIG. 1. By means of this operation, each input-output interface circuit 30 is able to operate selectively in three operating modes: namely an operating mode in which the output signal SO provided by the signal processing device 24 is amplified at the output buffer circuit 34 during transmitting through the external output signal transmission channel 35 (see FIG. 1) and transmitted to the associated external input-output terminal device 22 as an external output signal; an operating mode in which the external input signal SI from the external input-output terminal device 22 is amplified at the input buffer circuit 38 during transmitting through the external input signal transmission channel 39 (see FIG. 1) and transmitted as an input signal to the signal processing device 24 via the latch device 40; and an operating mode in which the output signal SO from the signal processing device 24 is transmitted not to the external input-output terminal device 22 as an external output signal but to the latch device 40 through the internal signal transmission channel 37 (see FIG. 1) as an internal signal and then the signal processing device 24 as an input signal.

In regard to the input-output interface circuit employed as the input-output interface circuit 30 of the computer system, although both output buffer circuit 34 and input buffer circuit 38 are supplied with an input switching control signal CS or CS1–CSm and, in response to the input switching control signal CS or CS1–CSm, while only the output buffer circuit 38 may respond to the input switching control signal CS or CS1–CSm by selectively assuming the ON state and OFF state, the input buffer circuit may always assume the ON state.

It is to be understood that although the present invention has been described with regard to preferred embodiments thereof, various other embodiments and variants may occur to those skilled in the art, which are within the scope and spirit of the invention, and such other embodiments and variants are intended to be covered by the following

What is claimed is:

1. An input-output circuit structure interposed between input/output signal processing means and external input-output terminal means for transmitting an external signal from the external input-output terminal means to the input/output signal processing means as an input signal and transmitting an output signal from the input/output signal processing means to the external input-output terminal means as an external output signal, said input-output circuit structure comprising:

first signal selection means having one input terminal and first and second output terminal for transmitting an output signal supplied from said input/output signal processing means to said output terminal of said first signal selection means;

second signal selection means having one input terminal and first and second output terminal for transmitting an input signal to signal processing means through said output terminal of said second signal selection means;

external output signal transmission channel means for connecting said first output terminal of said first signal selection means and said external input-output terminal means;

internal signal transmission channel means for connecting said second output terminal of said first signal selection means and said first input terminal of said second signal selection means; and external input signal transmission channel means for connecting said second input terminal of said second signal selection means and said external input-output terminal means;

said first signal selection means operating selectively in an external signal output mode in which said output signal is transmitted as an external output signal to said external input-output terminal means through said external output signal transmission channel means and an internal signal transmission mode in which said output signal is transmitted as an internal signal to said internal signal transmission channel means, and said second signal selection means operating selectively in an external signal input mode in which an external input signal from said external input signal transmission channel means is transmitted as said input signal and an internal signal output mode in which said internal signal from said internal signal transmission channel means is transmitted as said input signal.

2. An input-output circuit structure as defined in claim 1, wherein said external output signal transmission channel means includes a latch circuit and an output buffer circuit, said internal signal transmission channel means includes a latch circuit, and said external input signal transmission channel means includes an input buffer circuit.

3. An input-output circuit structure as defined in claim 2, wherein said output buffer circuit assumes an ON state while said first signal selection means operates in said external signal output mode.

4. An input-output circuit structure as defined in claim 3, wherein said input buffer circuit assumes an ON state while said second signal selection means operates in said external signal input mode.

5. An input-output circuit structure as defined in claim 4, and further comprising latch means connected to said output terminal of said second signal selection means for latching said input signal from said second signal selection means.

6. An input-output circuit structure as defined in claim 2, wherein said input buffer circuit assumes an ON state while said second signal selection means operates in said external signal input mode.

7. An input-output circuit structure as defined in claim 1, wherein said first signal selection means comprises a multiplexer which responds to an externally applied control signal by selectively operating in said external signal output mode and said internal signal input mode, and said second signal selection means comprises a multiplexer which responds to said externally applied control signal by selectively operating in said external signal input mode and said internal signal output mode.

8. An input-output circuit structure as defined in claim 1, and further comprising latch means connected to said output terminal of said second signal selection means for latching said input signal from said second signal selection means.

* * * * *